US 8,438,118 B2

(12) United States Patent
Ho

(10) Patent No.: US 8,438,118 B2
(45) Date of Patent: May 7, 2013

(54) TRANSPORTATION MANAGEMENT PROCESSES AND SYSTEMS

(76) Inventor: William P. C. Ho, Mukilteo, WA (US)

( * ) Notice: Subject to any disclaimer, the term of this patent is extended or adjusted under 35 U.S.C. 154(b) by 167 days.

(21) Appl. No.: 13/229,320

(22) Filed: Sep. 9, 2011

(65) Prior Publication Data

US 2012/0072364 A1    Mar. 22, 2012

Related U.S. Application Data

(63) Continuation of application No. 12/896,576, filed on Oct. 1, 2010, now abandoned, which is a continuation of application No. 11/758,498, filed on Jun. 5, 2007, now abandoned.

(51) Int. Cl.
*G06Q 30/00* (2012.01)

(52) U.S. Cl.
USPC .......... 705/338; 705/330; 705/332; 705/334; 705/336; 705/337

(58) Field of Classification Search ............... 705/1, 1.1, 705/7.11, 330, 332, 334, 336, 337, 338
See application file for complete search history.

(56) References Cited

U.S. PATENT DOCUMENTS

| | | | |
|---|---|---|---|
| 6,754,634 B1 | 6/2004 | Ho | |
| 7,127,411 B2 | 10/2006 | Ho | |
| 7,668,727 B2 * | 2/2010 | Mitchell et al. | 705/330 |
| 7,672,855 B2 * | 3/2010 | Peterkofsky et al. | 705/338 |
| 2005/0165629 A1 | 7/2005 | Bruns | |
| 2005/0246192 A1 | 11/2005 | Jauffred et al. | |
| 2006/0224423 A1 | 10/2006 | Sun et al. | |
| 2006/0265234 A1 * | 11/2006 | Peterkofsky et al. | 705/1 |
| 2008/0306795 A1 | 12/2008 | Ho | |
| 2011/0022535 A1 | 1/2011 | Ho | |

OTHER PUBLICATIONS

Charikar, Moses, Samir Khuller, and Balaji Raghavachari. "Algorithms for Capacitated Vehicle Routing." SIAM Journal on Computing 31.3 (2001): 665-18. Hoover's Company Profiles; ProQuest Central. Web. Feb. 23, 2013.*

* cited by examiner

*Primary Examiner* — John Hayes
*Assistant Examiner* — Michael Harrington
(74) *Attorney, Agent, or Firm* — Perkins Coie LLP

(57) ABSTRACT

The present invention relates to transportation management processes and systems. One aspect of the invention is directed toward a method in a computer system for determining one or more routes for transporting items, including receiving multiple orders to transport items from an origination stop to a destination stop, generating one or more consolidations, and generating one or more shipments wherein each shipment includes a selected consolidation that meets at least one shipment parameter or an order. The method further includes generating one or more routes with an ordered sequence of stops wherein each route is associated with one or more shipments. The method still further includes selecting one or more routes based on one or more route parameters.

14 Claims, 7 Drawing Sheets

ORDER A

01    D1    T1    P1

ORDER B

01    D1    T2    P2

ORDER C

02    D1    T3    P3

ORDER D

01    D2    T4    P4

ORDER E

03    D3    T5    P5

ORDER F

Consolidation AB;V1

01    D1    Tab    Pab    V1

*FIG. 4*

Consolidation AB;V2

01    D1    Tab    Pab    V2

*FIG. 5*

AB;V1 – C1
AB;V2 – C2
AF;V2 – C3
FB;V2 – C4
ABF;V2 – C5

AB;V1
AF;V2
FB;V2
ABF;V2
A
B
C
D
E
F

*FIG. 8*

| | | | | | | | |
|---|---|---|---|---|---|---|---|
| R1 | O1 | D1 | O3 | D3 | Pabe | Tabe | V1 |
| R2 | O1 | D1 | D3 | O3 | Pabe | Tabe | V1 |
| R3 | O1 | O3 | D1 | D3 | Pabe | Tabe | V1 |
| R4 | O1 | O3 | D3 | D1 | Pabe | Tabe | V1 |
| R5 | O1 | D3 | D1 | O3 | Pabe | Tabe | V1 |
| R6 | O1 | D3 | O3 | D1 | Pabe | Tabe | V1 |
| R7 | O3 | O1 | D3 | D1 | Pabe | Tabe | V1 |
| R8 | O3 | O1 | D1 | D3 | Pabe | Tabe | V1 |
| R9 | O3 | D3 | O1 | D1 | Pabe | Tabe | V1 |
| R10 | O3 | D3 | D1 | O1 | Pabe | Tabe | V1 |
| R11 | O3 | D1 | D3 | O1 | Pabe | Tabe | V1 |
| R12 | O3 | D1 | O1 | D3 | Pabe | Tabe | V1 |
| R13 | D1 | O1 | O3 | D3 | Pabe | Tabe | V1 |
| R14 | D1 | O1 | D3 | O3 | Pabe | Tabe | V1 |
| R15 | D1 | O3 | D3 | O1 | Pabe | Tabe | V1 |
| R16 | D1 | O3 | O1 | D3 | Pabe | Tabe | V1 |
| R17 | D1 | D3 | O1 | O3 | Pabe | Tabe | V1 |
| R18 | D1 | D3 | O3 | O1 | Pabe | Tabe | V1 |
| R19 | D3 | O1 | O3 | D1 | Pabe | Tabe | V1 |
| R20 | D3 | O1 | D1 | O3 | Pabe | Tabe | V1 |
| R21 | D3 | O3 | D1 | O1 | Pabe | Tabe | V1 |
| R22 | D3 | O3 | O1 | D1 | Pabe | Tabe | V1 |
| R23 | D3 | D1 | O1 | O3 | Pabe | Tabe | V1 |
| R24 | D3 | D1 | O3 | O1 | Pabe | Tabe | V1 |

*FIG. 9*

TRANSPORTATION MANAGEMENT PROCESSES AND SYSTEMS

CROSS-REFERENCE TO RELATED APPLICATION(S)

This application is a continuation of and incorporates by reference in its entirety U.S. patent application Ser. No. 12/896,576, filed Oct. 1, 2010 now abandoned and titled TRANSPORTATION MANAGEMENT PROCESSES AND SYSTEMS, which is a continuation of U.S. patent application Ser. No. 11/758,498, filed Jun. 5, 2007 now abandoned and titled TRANSPORTATION MANAGEMENT PROCESSES AND SYSTEMS.

TECHNICAL FIELD

The present invention relates to transportation management processes and systems, including computing system and methods for determining one or more routes for transporting items.

BACKGROUND

Shipping companies are faced with moving multiple packages between multiple locations. Accordingly, it is important that the shipping companies strive to schedule the movement of packages in an effective and efficient manner. For example, a shipping company may have packages at 11 different locations for delivery to 20 different destinations. Additionally, the packages can have varying delivery schedules and the shipping company can have a defined number of vehicles. Accordingly, the shipping company must determine which packages can be transported on which vehicle and determine the sequence of stops that each vehicle must make in order to deliver the packages to their corresponding destination on time.

The task of determining which packages to transport on which vehicle and determining the sequence of stops that each vehicle must make can be complicated, difficult, and time consuming, especially when there is a large number of packages and vehicles. One method that shipping companies use to perform this task is to select a "seed" package that is being shipped from one location to another based on some criteria (e.g., the heaviest package at a location) and to schedule the package for delivery on a first vehicle. Additional packages are then scheduled on the first vehicle for delivery at the same or a different location. The shipping company then selects another "seed" package and schedules it for delivery on a second vehicle. Additional packages are then scheduled on the second vehicle for delivery at the same or a different location, and so on, until all of the packages are scheduled for delivery. A drawback of this process is that once a seed package is selected and scheduled on a vehicle, future seed package and vehicle selections are limited to the remaining packages and vehicles. Accordingly, this process does not necessarily converge toward a low cost solution because early selections are blind to the consequences associated with subsequent selections and therefore, may eliminate lower cost solutions.

Even if a large number of combinations are tried (e.g., using a set of linear equations to predict the expense associated with each combination), the process is blind to the consequences associated with subsequent selections and there is no guarantee that the process will converge toward lower cost solutions. Furthermore, these processes generally do not account for real-world constraints and variables. For example, in many cases combinations are generated and tried, even though they are unrealistic or impractical. For instance, in many cases, these equations fail to take into account shipping restrictions (e.g., packages that must be placed in a refrigerated truck), mutually exclusive combinations, non-linear rate breaks for a large number of packages being shipped to a selected destination, etc.

SUMMARY

Certain aspects of the invention are directed generally toward transportation management processes and systems. For example, certain aspects of the present invention are directed toward a method in a computer system for determining one or more routes for transporting items, including receiving multiple orders to transport items from an origination stop to a destination stop. Each order can have an associated time attribute and an associated physical attribute. The method further includes generating one or more consolidations. Each consolidation can include an origination stop, a destination stop, a time attribute, a physical attribute, and a vehicle attribute. Each consolidation can be associated with two or more orders having common origination stops, common destination stops, and compatible time attributes. The origination stop of each consolidation can correspond to the common origination stops of the two or more associated orders. The destination stop of each consolidation can correspond to the common destination stops of the two or more associated orders. The physical attribute of each consolidation can correspond to the physical attributes of the two or more associated orders. The time attribute of each consolidation can be compatible with the time attributes of the two or more associated orders. The method can still further include generating one or more shipments wherein each shipment includes a selected consolidation that meets at least one shipment parameter or includes a single order, generating one or more routes with an ordered sequence of stops wherein each route is associated with one or more shipments, and selecting one or more routes based on one or more route parameters.

Other aspects of the present invention are directed toward a computer-readable medium containing instructions for controlling a computing environment to perform a method that includes receiving multiple orders to transport items from an origination stop to a destination stop. Each order can have an associated time attribute and an associated physical attribute. The method further includes generating one or more consolidations. Each consolidation can include an origination stop, a destination stop, a time attribute, a physical attribute, and a vehicle attribute. Each consolidation can be associated with two or more orders having common origination stops, common destination stops, and compatible time attributes. The origination stop of each consolidation can correspond to the common origination stops of the two or more associated orders. The destination stop of each consolidation can correspond to the common destination stops of the two or more associated orders. The physical attribute of each consolidation can correspond to the physical attributes of the two or more associated orders. The time attribute of each consolidation can be compatible with the time attributes of the two or more associated orders. The method can still further include generating one or more shipments wherein each shipment includes a selected consolidation that meets at least one shipment parameter or includes a single order, generating one or more routes with an ordered sequence of stops wherein each route is associated with one or more shipments, and selecting one or more routes based on one or more route parameters.

Still other aspects of the invention are directed toward a computing system for determining one or more routes for transporting items that includes an order receiving subsystem for receiving multiple orders to transport items from an origination stop to a destination stop. Each order can have an associated time attribute and an associated physical attribute. The system can further include a consolidation generating subsystem for generating one or more consolidations. Each consolidation can include an origination stop, a destination stop, a time attribute, a physical attribute, and a vehicle attribute. Each consolidation can be associated with two or more orders having common origination stops, common destination stops, and compatible time attributes. The origination stop of each consolidation can correspond to the common origination stops of the two or more associated orders. The destination stop of each consolidation can correspond to the common destination stops of the two or more associated orders. The physical attribute of each consolidation can correspond to the physical attributes of the two or more associated orders. The time attribute of each consolidation can be compatible with the time attributes of the two or more associated orders. The system can still further include a shipment generating subsystem for generating one or more shipments wherein each shipment includes a selected consolidation that meets at least one shipment parameter or includes a single order, a route generating subsystem for generating one or more routes with an ordered sequence of stops wherein each route is associated with one or more shipments, and a route selection subsystem for selecting one or more routes based on one or more route parameters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a partially schematic illustration of multiple orders in accordance with selected embodiments of the invention.

FIG. 4 is a partially schematic illustration of a consolidation in accordance with certain embodiments of the invention.

FIG. 5 is a partially schematic illustration of another consolidation in accordance with selected embodiments of the invention.

FIG. 6 is a partially schematic illustration of costs associated with selected consolidations in accordance with certain embodiments of the invention.

FIG. 7 is a partially schematic illustration of cost associated with selected orders in accordance with selected embodiments of the invention.

FIG. 8 is a partially schematic illustration of selected shipments in accordance with certain embodiments of the invention.

FIG. 9 is a partially schematic illustration of multiple routes in accordance with selected embodiments of the invention.

DETAILED DESCRIPTION

In the following description, numerous specific details are provided in order to give a thorough understanding of embodiments of the invention. One skilled in the relevant art will recognize, however, that the invention may be practiced without one or more of the specific details, or with other methods, components, materials, etc. In other instances, well known structures, materials, or operations are not shown or described in order to avoid obscuring aspects of the invention.

References throughout the specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
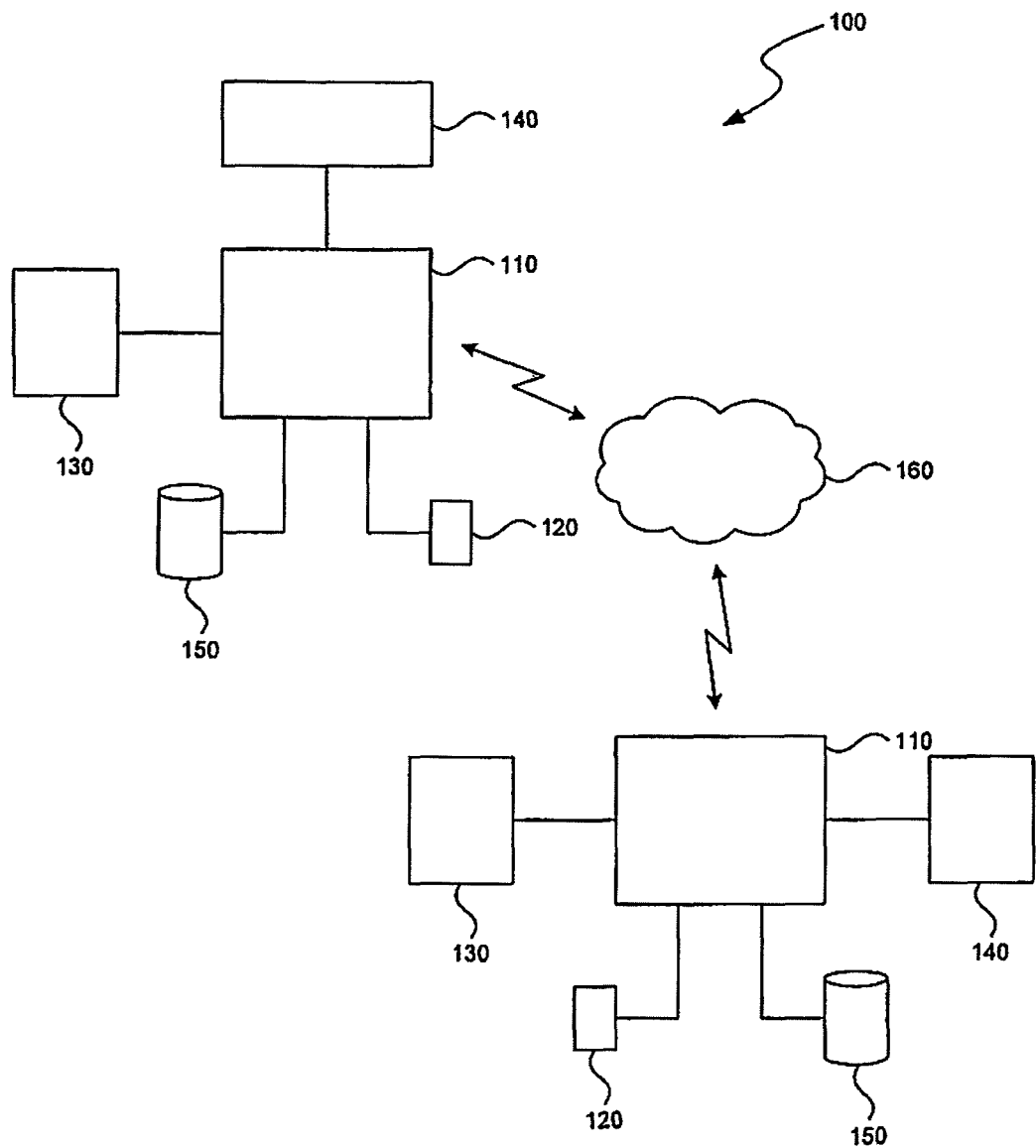
FIG. 1 is partially schematic illustration of a computing environment suitable for implementing various embodiments of the invention.

FIGS. 1-11 illustrate various aspects of transport management systems and processes in accordance with certain embodiments. FIG. 1 is a partially schematic illustration of a computing system or environment suitable for implementing various embodiments of the invention. As illustrated in FIG. 1, the computing system 100 on which the system can be implemented may include one or more central processing unit 110, one or more memories 120, one or more input devices 130 (e.g., keyboard and pointing devices), one or more output devices 140 (e.g., display devices and printers), and one or more storage devices 150 (e.g., disk drives). The memory and storage devices can include computer-readable media that may contain instructions that implement the system. In addition, the data structures and message structures may be stored or transmitted via a data transmission medium, such as a signal on a communication link 160. Various communication links 160 may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and so on. The computer systems may include personal digital assistants, cellular/smart phones, personal computers, programmable consumer electronics, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, in selected embodiments a subsystem can include a program module and portions of the computing system configured to store, interface, run, and/or execute the program module.

Additionally, in selected embodiments the functionality of various embodiments above can be combined with and/or integrated into other computer implemented processes.

Figure 2:
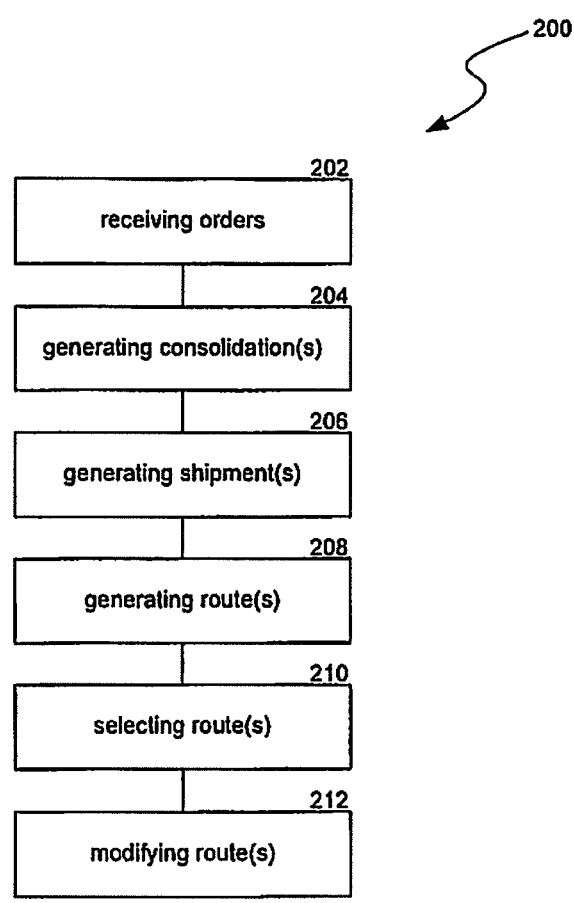
FIG. 2 is a flow diagram that illustrates a process for selecting one or more routes for transporting items in accordance with the selected embodiments of the invention.

FIG. 2 is a flow diagram that illustrates a process 200 in a computing environment for determining one or more routes for transporting items in accordance with the selected embodiments of the invention. In FIG. 2, the process includes receiving orders 202, generating consolidation(s) 204, generating shipment(s) 206, generating route(s) 208, and selecting route(s) 210. Additionally, in selected embodiments the process 200 can include modifying route(s) 212.

For example, in certain embodiments orders having common origination stops and destination stops can be formed or combined into consolidations and associated with selected vehicles. The consolidations can be tested to determine if they meet selected shipment parameter(s). Those consolidations that meet the selected shipment parameter(s) can be designated shipments along with the individual orders. Accordingly, each shipment includes a single origination stop and a single destination stop. In certain embodiments, because the consolidations have to meet the selected shipment parameter(s) in order to be designated a shipment, only those consolidations that are feasible and/or provide a cost savings over transporting the associated orders individually are designated as shipments.

In selected embodiments, one or more of the shipments can then be combined into one or more routes wherein each route is associated with a vehicle and a sequence of stops (e.g., a sequence of stops made up of the origination stops and destination stops associated with the shipments corresponding to the route). One or more routes can then be selected based on route parameter(s). In further embodiments, at least one of the selected routes can be modified by adding an additional shipment to the route.

In some of the embodiments discussed above, because the shipments are not mutually exclusive (e.g., multiple shipments can contain the same order), each of the shipments is available to form the one or more routes. Accordingly, a route set can be generated that has a wide variety of shipment combinations. The route(s) in the set of route(s) also do not need to be mutually exclusive (e.g., multiple routes can contain the same shipment). Accordingly, a meaningful route set can be established, at least some of the routes can be compared to one or more selected route parameter(s), and one or more routes can be selected (e.g., one or more routes can be selected based on cost and/or versatility).

A feature of some of these embodiments is that none of the shipments are committed to until at least one route is selected. An advantage of this feature is that although the unfeasible and/or expensive consolidations may have been filtered out because they did not meet the shipment parameter(s), all of the shipments are available to form the route(s). Accordingly, route(s) can be generated without having to unnecessarily limit the shipments available for forming routes. This feature can provide a more meaningful route set from which route(s) can be selected. Therefore, in certain embodiments the process can be used to efficiently converge on routes meeting selected parameters.

For example, receiving orders 202 can include receiving multiple orders in a computing system to transport items (e.g., materials, packages, and/or the like) from an origination to a destination. As shown in FIG. 3, in selected embodiments each order can include a data set having an origination stop, a destination stop, an associated time attribute, and an associated physical attribute. For example, in FIG. 3 order A can include a data element having an origination stop O1, a destination stop D1, an associated time attribute T1, and an associated physical attribute P1. For example, in the illustrated embodiment the origination stop O1 and the destination stop D1 represent the origination where the item(s) associated with the order A are to be picked up and the destination where the item(s) associated with order A are to be dropped off, respectively.

In the illustrated embodiment, the time attribute T1 includes the time windows (e.g., the range of time(s) and date(s)) when the item(s) associated with order A are to be picked up and dropped off (e.g., pickup 18 Dec. 2006; 0800-1600/drop off 24 Dec. 2006; 1200-1600). In other embodiments, the time attribute can have other arrangements (e.g., only a time window for pickup or a time window associated with a product expiration date). The physical attribute P1 can include physical attributes or information about the item(s) associated with order A. For example, the physical attribute P1 can include the weight of the item(s), the volume of the item(s), the type of item(s), requirements associated with the item(s) (e.g., the item(s) must be refrigerated), and/or the like.

In FIG. 3, orders B, C, D, E, and F contain origination stops, destination stops, associated time attribute, and associated physical attributes similar to those discussed above with reference to order A. For example, order B includes origination stop O1, destination stop D1, associated time attribute T2, and associated physical attribute P2. Order C includes origination stop O2, destination stop D1, associated time attribute T3, and associated physical attribute P3. Order D includes origination stop O1, destination stop D2, associated time attribute T4, and associated physical attribute P4. Order E includes origination stop O3, destination stop D3, associated time attribute T5, and associated physical attribute P5. Order F includes origination stop O1, destination stop D1, associated time attribute T6, and associated physical attribute P6.

In selected embodiments, generating consolidations (shown as block 204 in FIG. 2) can include generating one or more consolidations from the multiple orders. For example, a consolidation can be formed by combining two or more orders that have common origination stops, common destination stops, and compatible time attributes. Additionally the orders forming the consolidation can be assigned to a selected vehicle. Accordingly, each consolidation can include a data element with an origination stop, a destination stop, a time attribute, a physical attribute, and a vehicle attribute.

For example, orders A and B (shown in FIG. 3) have common origination stops O1 and common destination stops O2. In the illustrated embodiment, the time attributes T1 and T2 can be compatible if the pickup windows and drop off windows associated with orders A and B overlap (e.g., intersect). Accordingly, in selected embodiments the items associated with orders A and B can be combined on a single vehicle, can be picked up during the intersection of the pickup windows associated with orders A and B, and can be dropped of during the intersection of the drop off windows associated with orders A and B.

Accordingly, as shown in FIG. 4, a consolidation AB;V1 associated with combining orders A and B can include an origination stop O1 corresponding to the common origination stops of orders A and B, and a destination stop D1 corresponding to the common destination stops of orders A and B. Additionally, the consolidation can include a physical attribute Pab corresponding to the physical attributes of orders A and B. For example, the physical attribute associated with the consolidation AB;V1 can include the combined weight or volume of the items in orders A and B, a combined list of the items in orders A and B, the combined restrictions associated with the items in orders A and B, and/or the like.

The consolidation AB;V1 can also include an associated time attribute Tab compatible with the time attributes of orders A and B. For example, in certain embodiments associated time attribute of the consolidation can include a pickup time window and a drop off time window. The pickup window of the consolidation can be the intersection of the pickup windows of orders A and B and the drop off window of the consolidation can be the intersection of the drop off windows of orders A and B. Additionally, the consolidation AB;V1 can include a vehicle attribute. For example, in the illustrated embodiment the consolidation AB;V1 includes a vehicle attribute V1 associated with the vehicle that the items associated with orders A and B can be assigned to and/or carried on. In selected embodiments the vehicle attribute can include a vehicle identification (e.g., truck 105 or aircraft N234) and/or other information associated with the vehicle (e.g., the vehicle has refrigerated storage, the vehicle has a weight limit, the vehicle has a range or speed limit, and/or the like). Although in the illustrated embodiment the consolidation AB;V1 is associated with two orders, in other embodiments a consolidation can include more than two orders.

In the illustrated embodiment, for the purpose of forming consolidations in process 200, it does not matter what sequence the orders are combined. For example, because both orders A and B in consolidation AB;V1 have common origination stops and common destination stops, it does not matter which sequence the orders are placed on the vehicle. Therefore, when forming consolidation AB;V1 it does not matter whether you combine order A with order B or order B with order A (e.g., in either case you would end up with AB;V1). However, a person skilled in the art will understand that once a route is selected (as described below), the selected route, along with other factors, may dictate the sequence in which items associated with the route (and corresponding orders) are loaded on the vehicle.

In selected embodiments, for a set of orders and a set of vehicles, every order and vehicle combination can be formed where the orders in each consolidation include common origination stops, common destination stops, and compatible time attributes. For example, in a selected embodiment where there are two vehicles that can carry the items in orders A and B, another consolidation AB;V2 can be formed, where vehicle attribute V1 is associated with a first vehicle and a second vehicle has an associated vehicle attribute V2. As shown in FIG. 5, the consolidation AB;V2 can include the same origination stop O1, destination stop D1, the same time attribute Tab, and the same physical attribute Pab as consolidation AB;V1, but include vehicle attribute V2 instead of vehicle attribute V1.

In other embodiments, some, but not all, order and vehicle combination are formed into consolidations. For example, in certain embodiments in order to save time, only a selected portion or number of orders are formed into consolidations. For instance, in selected embodiments no more than 3 orders are combined into a consolidation.

In certain embodiments, generating shipments (shown as block 206 in FIG. 2) can include generating one or more shipments wherein each shipment includes a selected consolidation that meets at least one shipment parameter or includes an order. For example, in selected embodiments a shipment parameter can include a constraint (e.g., real world constraint), business rule, or other characteristics which a consolidation must meet in order to become, or be designated, a shipment. In certain embodiments, each order is also included as a shipment (e.g., even though the order is not associated with a vehicle) to insure that each order can be considered in generating one or more routes.

In the illustrated embodiment, the shipment parameter(s) can include order mateability, vehicle mateability, additional time attributes (e.g., associated with the vehicle, the operation of the vehicle, the origination stop, or the destination stop), a characteristic that would make the order vehicle combination infeasible, and/or the like. For example, in selected embodiments a consolidation may not be feasible if two orders are not mateable with one another (e.g., an order having one type of hazardous material might not be combinable with an order having another type of hazardous material). In other embodiments, selected orders may not be mateable with selected vehicles (e.g., an order that is required to be refrigerated might not be combinable with a vehicle that does not have a refrigeration unit/container or a selected combination of orders might be too large and/or heavy for a selected vehicle to carry).

In other embodiments, other constraints can be included as shipment parameter(s). For example, in certain embodiments shipment parameter(s) can include constraints associated with Federal Department of Transportation rule (e.g., duty time for a driver, mandatory breaks, etc.) and/or state or local traffic/transportation codes. In other embodiments, shipment parameter(s) can include constraints associated with the origination/destination stops (e.g., the type of vehicle docking available at an origination/destination stop, monetary penalties for arriving at an origination/destination stop early or late, monetary assessments associated with waiting at an origination/destination stop, maximum allowed waiting times at an origination/destination stop, vehicle loading and unloading times, etc.). In still other embodiments, the shipment parameter(s) can include other real world travel constraints such as likely time delays due to rush hour traffic in certain areas during certain time periods. In yet other embodiments, the shipment parameter(s) can include vehicle related constraints such as the maximum speed that a selected vehicle can achieve or maintain, a time period during which a selected vehicle can operate (e.g., during day light hours only), and/or the type of roads a selected vehicle requires (e.g., a road weight bearing capacity and/or a maximum achievable turn radius).

In still other embodiments, the shipment parameter(s) can include a selected consolidation having a corresponding cost that is less than the sum of the costs corresponding to the two or more orders associated with the selected consolidation. For example, in certain embodiments a consolidation can be selected and the cost corresponding to the selected consolidation (e.g., an estimated or a predicted cost for transporting the items associated with the orders corresponding to the consolidation between the consolidation origination stop and the consolidation destination stop) can be generated. Additionally, the costs corresponding to each order associated with the consolidation (e.g., an estimated or a predicted cost for transporting items associated with each order from the corresponding order to origination stop to the corresponding order destination stop) can be generated. Accordingly, generating a shipment can include determining whether the selected consolidation has a corresponding cost that is less than the sum of the costs corresponding to the two or more orders associated with the selected consolidation.

One skilled in the art will recognize that there are various methods and/or computer programs which can be used to generate a cost (e.g., estimated, projected, and/or actual cost) associated with an order, a consolidation, a shipment, and/or a route. For example, current cost generating software or methods include rating oracles, travel oracles, Czar, Zone based shipping rates, Flat-Cost shipping rates, Distance-Based shipping rates, and/or the like. For example, in selected embodiments a lookup table that includes the shipping cost per unit weight between zip codes can be used to generate costs. In other embodiments, a lookup table that includes the shipping cost per unit weight between city pairs and/or per mile can be used to generate costs. In still other embodiments, a travel oracle can be used that estimates travel time depending on the time period of travel and adjusts the associated cost for expected delays can be used to generate costs. In yet other embodiments, other methods and programs for generating associated costs can be used.

In certain embodiments, all possible consolidations can be formed and then the shipment parameter(s) can be applied to each consolidation to determine whether the consolidation should be used to generate a shipment. In other embodiments, the shipment parameter(s) can be applied to each consolidation as the consolidation is formed (e.g., concurrently or nearly concurrently with determining if the associated orders have common origination stops, common destination stops, and compatible time attributes). In still other embodiments, all order/vehicle combinations can be formed and the order/vehicle combinations can be tested to determine if the associated orders have common origination stops, common destination stops, and compatible time attributes (e.g., to determine if the order/vehicle combination can be a consolidation). Then, the shipment parameter(s) can be applied to each consolidation to determine if the consolidation should become a shipment.

For example, in one embodiment for a list of orders and a list of vehicle attributes (e.g., wherein each vehicle attribute represents a vehicle), the process of generating consolidations and generating shipments can be accomplished in combination, and can include:

1. Generate a set of all two order/vehicle attribute combinations from the lists of orders and vehicle attributes (e.g., AB;V1; AB;V2; etc.). As discussed above, because the sequence in which the orders are combined in a consolidation or a shipment is unimportant, there is no need to select both AB;V1 and BA;V1 because they are equivalent and, therefore, not unique. Accordingly, only unique combinations need to be selected.
2. Select each two order/vehicle attribute combination.
3. Test that the selected two order/vehicle attribute combination includes a common origination stop and a common destination stop. If not, discard the selected combination. If so, proceed to step 4.
4. Test that the time attributes of the selected two order/vehicle attribute combination are compatible. If not, discard the selected combination. If so, proceed to step 5.
5. Test that the selected two order/vehicle attribute combination meets one or more shipment parameter(s). If not, discard the selected combination. If so, designate the selected two order/vehicle attribute combination as a shipment.
6. Generate a set of all three order/vehicle attribute combinations from the lists of orders and vehicle attributes (e.g., ABC;V1; ABC;V2; etc.).
7. Select each three order/vehicle attribute combination.
8. Test that the selected three order/vehicle attribute combination includes a common origination stop and a common destination stop. If not, discard the selected combination. If so, proceed to step 9.
9. Test that the time attributes of the selected three order/vehicle attribute combination are compatible. If not, discard the selected combination. If so, proceed to step 10.
10. Test that the selected three order/vehicle attribute combination meets one or more shipment parameter(s). If not, discard the selected combination. If so, designate the selected three order/vehicle attribute combination as a shipment.
11. And so on.

In certain embodiments, the above process can be continued until all combinations have been tested. For example, if there are 50 orders in the list, the above process can generate, select, and test a set of all two order/vehicle attribute combinations, then a set of all three order/vehicle attribute combinations, ... and finally, a set of all fifty order/vehicle attribute combinations. In other embodiments, the process can be stopped once a set is found that does not generate any shipments. For example in selected embodiments, if the set of all three order/vehicle attribute combinations does not generate any shipments, the process can be terminated and subsequent order/vehicle attribute sets are not tested (e.g., four order/vehicle attribute sets are not generated, selected, or tested).

In FIG. 3, the following orders A, B, and F include common origination stops and common destination stops. Assuming that they have compatible time attributes T1, T2, and T6, the following consolidations can be generated: AB;V1; AB;V2; AF;V1; AF;V2; FB;V1; FB;V2; ABF;V1; and ABF;V2. If order F is required to be carried on a refrigerated vehicle (e.g., a shipment parameter) and vehicle V1 is does not include a refrigerated facility, then all combinations that include order F and vehicle attribute V1 cannot become shipments (e.g., and can be discarded). Accordingly, only consolidations AB;V1; AB;V2; AF;V2; FB;V2; and ABF;V2 need to be tested against other shipment parameter(s).

In the illustrated embodiment, the remaining consolidations can be tested against a shipment parameter that includes comparing the cost of transporting the consolidation to the sum of the costs of transporting the associated orders. For example, FIG. 6 shows the cost associated with transporting the remaining consolidations (e.g., the estimated or predicted cost of transporting the consolidations can be computed by a travel oracle or rating oracle). FIG. 7 illustrates the cost associated with transporting the individual orders (e.g., the estimated or predicted cost of transporting the orders can be computed by a travel oracle or rating oracle). Accordingly, if the cost associated with consolidation AB;V2 (e.g., C2) is equal to or greater than the sum of the costs associated with orders A and B (e.g., C6+C7), then there may be no reason to combine orders A and B for shipping. Therefore, consolidation AB;V2 can be discarded (e.g., not designated as a shipment). In other embodiments, the shipment parameter(s) can include other criteria and/or be applied differently. For example, in other embodiments the consolidation AB;V2 can be designated as a shipment if the cost associated with AB;V2 is equal to or less than the sum of the costs associated with orders A and B.

In the illustrated embodiment, consolidations AF;V1; BF;V1; ABF;V1 and AB;V2 have been discarded because they did not meet selected shipment parameter(s). As shown in FIG. 8, the other consolidations have been designated as shipments. Additionally, in the illustrated embodiment each of the orders have been designated as shipments to insure that all of the orders will be available to generate routes. Accordingly, in the illustrated embodiment FIG. 8 illustrates the set of shipments available for route generation. In other embodiments there can be more, fewer, and/or different consolidations, orders, and/or shipments. For example, in other embodiments a much larger set of vehicles and a much larger set of orders having a large number of different origination stops and destination stops can be considered when generating consolidations and shipments.

Generating route(s) (shown as block 208 in FIG. 2) can include generating one or more routes with an ordered sequence of stops, where each route is associated with one or more shipments. A route can include one or more shipments and includes a physical attribute associated with the physical attribute of the corresponding shipment(s) and a time attribute associated with time attributes of the corresponding shipment(s). Additionally, the route includes the origination stops and the destination stops associated with the corresponding shipments.

For example, as shown in FIG. 9, shipment AB;V1 has been combined with shipment E to form one or more routes. In the illustrated embodiment, shipment AB;V1 is associated with origination stop O1 and destination stop D1. Shipment E is associated with origination stop O3 and destination stop D3. Accordingly, because there are four total stops associated with the combined shipments, there are 4! possible stop sequence permutations that can be considered or used to generate routes having an ordered sequence of stops. Accordingly, in FIG. 9 there are 24 routes (shown as R1-R24) with unique stop sequences.

In FIG. 9, each route has been associated with vehicle attribute V1 because shipment E does not have a vehicle attribute associated with it and the items in shipment AB;V1 and in shipment E would be combined on the vehicle associated with vehicle attribute V1. Also in the illustrated embodiment the routes include a physical attribute Pabe that is associated with the physical attributes associated with shipments AB;V1 and shipment E (e.g., Pabe can be the combined weight or volume of the shipments and/or a list of the items associated with the shipment). Additionally, in the illustrated embodiment the routes are associated with a time attribute Tabe. The time attribute Tabe is associated with the time attributes of shipments AB;V1 and E (e.g., the pickup and drop off windows for the associated shipments). In other embodiments the routes can include different physical attributes and time attributes.

In the illustrated embodiment, additional route sets can be generated using other shipment combinations. For example, other two shipment combinations having other associated orders and associated vehicle attributes can be combined to generate other route sets. Additionally, route sets can include the combination of more than two shipments (e.g., three shipment combinations, four shipment combinations, etc.). Route(s) in the one or more route sets can then be compared with one or more route parameters, and one or more routes can be selected based on this comparison (e.g., selecting route(s), shown as block 210 in FIG. 2).

Similar to the shipment parameter(s) discussed above, in selected embodiments the route parameters can include a constraint (e.g., real world constraint), business rule, or other characteristics. The route parameter can be used to, among other things, determine if a route is feasible, to determine if a route should be considered as part of a final solution, to "rate" how desirable a route is with respect to certain characteristics, and/or to aid in selecting a route to be used (e.g., used to schedule the transportation of items associated with the route, stored for later scheduling, and/or printed out for later scheduling). For example, in FIG. 9 many of the routes are not feasible because items associated with a selected order in a shipment must be picked up (e.g., at an associated origination stop) before they can be dropped off (e.g., at an associated destination stop). Accordingly, any route where D1 precedes O1 and/or any route where D3 precedes O3 is not a feasible route (i.e., R2, R5, R6, and R10-R24 are not feasible.) In certain embodiments, this route parameter can be applied concurrently with the formation of the routes so that non-feasible routes are not considered with respect to other route parameters.

In the illustrated embodiment, the route parameter(s) can include other constraints, business rules, and/or characteristics. For example, in certain embodiments the route parameter can include shipment mateability characteristics, vehicle mateability characteristics, additional time attributes (e.g., associated with the vehicle, the operation of the vehicle, the origination stop, or the destination stop), a characteristic that would make the shipment vehicle combination infeasible, and/or the like. For example, in selected embodiments a consolidation may not be feasible if two shipments are not mateable with one another (e.g., a shipment having one type of hazardous material might not be combinable with a shipment having another type of hazardous material). In other embodiments, selected shipments may not be mateable with selected vehicles (e.g., a shipment that is required to be refrigerated might not be combinable with a vehicle that does not have a refrigeration unit/container or a selected combination of shipments might be too large and/or heavy for a selected vehicle to carry).

Additionally, in selected embodiments route parameter(s) can be used to determine if a route is feasible based on the vehicle attributes associated with the corresponding shipments and/or to assign a vehicle attribute to a route. For example, in selected embodiments route parameter(s) can allow shipments having the same vehicle attributes to be combined for route generating purposes. Additionally, route parameter(s) can allow shipments with common vehicle attributes to be combined with shipments having no vehicle attributes (e.g., a single order shipment) for route generation, and cause the common vehicle attribute to be assigned to the associated routes. Furthermore, route parameters can allow shipments having no vehicle attributes to be combined together for route generation and can cause vehicles from a list to be associated with various routes formed from the shipment combination. For example, a first single order shipment without a vehicle attribute can be combined with a second single order shipment without a vehicle attribute, a first vehicle can be assigned to the combination, and various routes with various stop sequences can be generated. A second vehicle can then be assigned to the combination of single order shipments and routes with various stop sequences can be generated. In selected embodiments, this process could be continued for all available vehicles.

In other embodiments, other constraints can be included as route parameter(s). For example, in certain embodiments route parameter(s) can include constraints associated with Federal Department of Transportation rule (e.g., duty time for a driver, mandatory breaks, etc.) and/or state or local traffic/transportation codes. In other embodiments, route parameter(s) can include constraints associated with the origination/destination stops (e.g., the type of vehicle docking available at an origination/destination stop, monetary penalties for arriving at an origination/destination stop early or late, monetary assessments associated with waiting at an origination/destination stop, maximum allowed waiting times at an origination/destination stop, vehicle loading and unloading times, etc.). In still other embodiments, the route parameter(s) can include other real world travel constraints such as likely time delays due to rush hour traffic in certain areas during certain time periods. In yet other embodiments, the route parameter(s) can include vehicle related constraints such as the maximum speed that a selected vehicle can achieve or maintain, a time period during which a selected vehicle can operate (e.g., during day light hours only), and/or the type of roads a selected vehicle requires (e.g., a road weight bearing capacity and/or a maximum achievable turn radius).

In still other embodiments, the route parameter can include a "double back" criteria. For example, if the further destination stop associated with a routing is west of all other stops associated with a routing, a double back criteria could be used to see if any of the stops in the route stop sequence require a carrier or vehicle to proceed east bound more than a selected distance (e.g., a percentage of the distance between the most easterly origination stop and the most westerly destination stop). If a route exceeds a double back criteria, the route could be associated with a level of undesirability corresponding to the amount that the double back criteria is exceeded and/or the number of times the double back criteria is exceeded. This rating can be used/considered in selecting one or more routes, for example, as compared to other routes.

In selected embodiments, route parameter(s) can include the versatility associated with selecting a certain route as compared to selecting other routes. The versatility of a selected route can include a measure of how common the orders associated with the selected route are to other routes. As discussed below in further detail, if a route is selected that includes orders that are contained in other routes, the other routes containing those orders can be eliminated from consideration for future route selection because they contain one or more orders that are associated with the selected route. Accordingly, in certain embodiments it can be desirable to select routes with low versatility (e.g., routes that contain orders that are less common to a large number of other routes) to preserve the largest number of routes for subsequent selections.

For example, in selected embodiments the number of times each order appears in a list of routes (e.g., a list including all generated routes or including a subset of all generated routes) can be determined and associated with the order as an appearance number. Accordingly, the versatility for a selected route can be computed by adding up the appearance number of each order that is associated with the selected route. The higher the sum of the appearance numbers, the higher the versatility. In other embodiments, versatility can be associated with shipments contained in an associated list of shipments in a similar manner.

In yet other embodiments, the route parameter(s) can include a selected route having a corresponding cost that is less than the sum of the costs corresponding to the order(s) associated with the selected route or corresponding to the two or more shipment(s) associated with the selected route. For example, in certain embodiments a route can be selected and the cost corresponding to the selected route (e.g., an estimated or a predicted cost for transporting the items associated with the orders corresponding to the route between the associated origination stop(s) and the associated destination stop(s)) can be generated. Additionally, the costs corresponding to each order associated with the route (e.g., an estimated or a predicted cost for transporting items associated with each order from the corresponding order to origination stop to the corresponding order destination stop) can be generated. Accordingly, generating a route can include determining whether the selected route has a corresponding cost that is less than the sum of the costs corresponding to the orders associated with the selected route. Similarly, in other embodiments the cost associated with the route can be compared to the sum of the costs associated with the corresponding shipments.

One skilled in the art will recognize that there are various methods and/or computer programs which can be used to generate a cost (e.g., estimated, projected, and/or actual cost) associated with an order, a consolidation, a shipment, and/or a route. For example, current cost generating software or methods include rating oracles, travel oracles, Czar, Zone based shipping rates, Flat-Cost shipping rates, Distance-Based shipping rates, and/or the like. For example, in selected embodiments a lookup table that includes the shipping cost per unit weight between zip codes can be used to generate costs. In other embodiments, a lookup table that includes the shipping cost per unit weight between city pairs and/or per mile can be used to generate costs. In still other embodiments, a travel oracle can be used that estimates travel time depending on the time period of travel and adjusts the associated cost for expected delays can be used to generate costs. In yet other embodiments, other methods and programs for generating associated costs can be used.

In certain embodiments, all possible routes can be formed and then the route parameter(s) can be applied to each route to determine whether the route is feasible, whether the route should be selected, and/or the like. In other embodiments, at least some of the route parameter(s) can be applied to each route as the route is formed. Routes that do not meet the applied route parameter(s) can be discarded. Additional route parameter(s) can then be applied to the routes that are not discarded. Furthermore, for the sake of expedience route parameter(s) can limit the number of shipments that are combined into any one route. For example, if there are thirty shipments, in some cases routes could be constructed that include two shipments, three shipments, etc. all the way up route(s) that contain all thirty shipments. In selected embodiments, the route parameter(s) can be used to limit route generation and/or selection to those routes that combine a selected number of shipments or less (e.g., 5 shipments or less).

For example, in one embodiment the process of generating routes and selecting routes can include:

1. Generate sets of all two shipment routes (e.g., routes containing two shipments) from a list of shipments.
2. Select each two shipment route.
3. Apply route parameter(s) to determine whether the selected two shipment route is feasible. For example, in selected embodiments determining whether a route is feasible can include, among other things, ensuring that the route does not include shipments containing the same order(s) (e.g., no order can appear more than once in the selected route). If the selected route is not feasible, the selected route can be discarded. If the selected route is feasible, proceed to step 4.
4. Apply route parameter(s) to determine the cost and versatility of the selected two shipment route.
5. Save the selected route in a list of feasible routes with the associated cost and versatility information.
6. Generate sets of all three shipment routes from the list of shipments.
7. Select each three shipment route.
8. Apply route parameter(s) to determine whether the selected three shipment route is feasible (e.g., in a manner similar to that discussed above with reference to two shipment routes). If not, the selected route can be discarded. If the selected route is feasible, proceed to step 9.
9. Apply route parameter(s) to determine the cost and versatility of the selected three shipment route.
10. Save the selected three shipment route in the list of feasible routes with the associated cost and versatility information.
11. And so on until all feasible routes have been generated or until all feasible routes having a less than or equal to a selected number of shipments have been generated.

In selected embodiments, route parameters can then be used to select one or more routes from the list of feasible routes. For example, in certain embodiments methods similar to those discussed in U.S. Pat. No. 7,127,411, entitled METHODS FOR SCHEDULING TRANSPORTATION RESOURCES, issued Oct. 24, 2006, and U.S. Pat. No. 6,754, 634, entitled METHODS FOR SCHEDULING TRANSPORTATION RESOURCES, issued Jun. 22, 2004, both of which are fully incorporated herein by reference, can be used, at least in part, to select routes from the feasible routes list. For instance, in certain embodiments cost saving bands can be established. For example, in one embodiment establishing saving bands can include establishing a first band having a savings of less than $100, a second band having a savings of $100 to $199, a third band having a savings of $200 to $299, a fourth band having a savings of $300 to $399, a fifth band having a savings of $400 to $499, and a sixth band having a savings of greater than $499. Routes having the associated cost savings over the sum of the cost associated with the corresponding individual orders or shipments can be placed in each of the appropriate bands.

Figure 10:
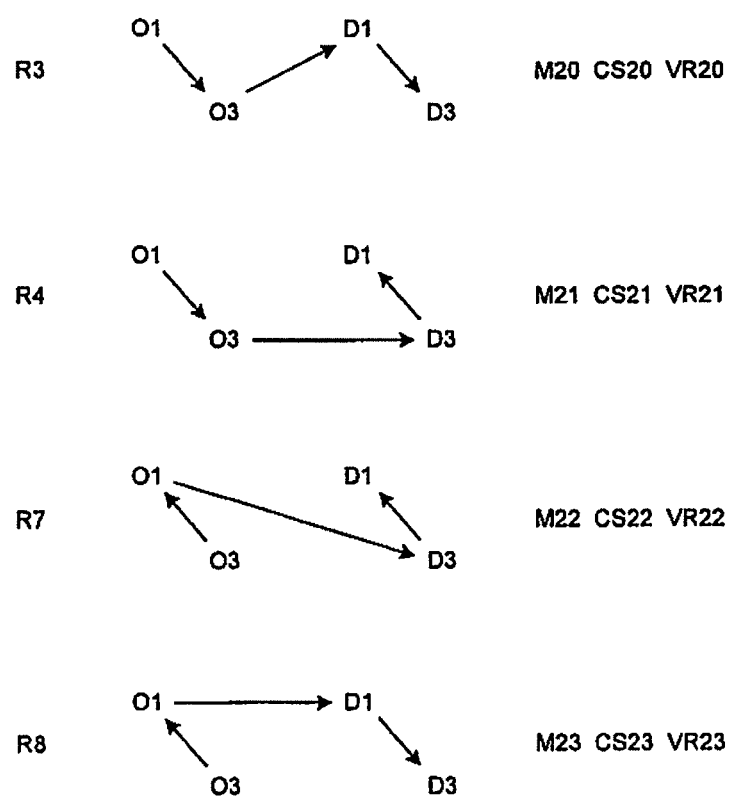
FIG. 10 is a partially schematic illustration of costs associated with four routes in accordance with certain embodiments of the invention.

For example, FIG. 10 shows four routes R3, R4, R7, and R8. Each route has an associated mileage M20, M21, M22, and M23, respectively, depending on the sequence of stops. Additionally, each route has an associated cost savings CS20, CS21, CS22, and CS23, respectively, representing the cost savings over the sum of the cost associated with the individual shipments AB;V1 and E. Furthermore, each route includes a versatility VR20, VR21, VR22, and VR23, respectively, representing the versatility of each route. For example, if the cost savings of routes R3, R4, R7, and R8 place the routes into the sixth savings band, the versatility can be determined based on all of the routes in the sixth savings band. Similarly, the versatility of all of the other routes in the sixth savings band (e.g., other than R3, R4, R7, and R8, if any) and the routes in the first through the fifth savings bands can be determined.

In selected embodiments, a route can be selected from the sixth savings band based, at least in part, on versatility. For example, a route can be selected that has the lowest versatility, has the most component orders, has a vehicle with the largest capacity, has a vehicle associated with a desired carrier (e.g., when using multiple independent carriers to transport various orders and it is desirable to give a shipment to the most reliable carrier and/or to an under utilized carrier), and/or other route parameter(s). Once a route is selected from the sixth savings band, conflicting routes can be removed from all of the savings bands (e.g., routes that contain one or more orders that are included in the selected route are in conflict with the selected route because in the final solution two routes cannot carrier the same order). A route can then be selected from the fifth savings band, the fourth savings band, the third savings band, the second savings band, and the first savings band, in turn, using a similar process. As routes are selected from the savings bands, if all of the routes in a subsequent savings band have been eliminated (e.g., due to conflicting orders) then a route from the next savings band is selected.

In other embodiments, other methods can be used to select routes form the feasible routes list. For example, in selected embodiments more, fewer, and/or different savings bands can be established. In other embodiments, multiple routes can be selected from selected savings bands. For example, in certain embodiments the route with the lowest versatility can be selected from the sixth savings band, conflicting routes can be eliminated, and then the route having the lowest versatility of the remaining routes in the sixth savings band can be selected, and so on. Once there are no more remaining routes in the sixth savings band, a similar process can be used to select routes from the fifth savings band, then the fourth savings band, etc. In other embodiments, other route parameter(s) can be used to assign a numerical rating to various routes or route combinations and an operator can select the routes based on the numerical rating.

In selected embodiments, once the routes have been selected using the process described above, one or more of the selected routes can be modified (shown as block 212 in FIG. 2) to include one or more additional shipments (e.g., shipments that were not included in the selected routes or non-included shipments). In certain embodiments, a route criteria can be used to determine if the modified route should be used or discarded. The route criteria can include a constraint (e.g., real world constraint), business rule, or other characteristics including cost comparisons, similar to the route parameter(s) discussed above.

In certain embodiments, a process similar to that discussed above with reference to generating and selecting routes using route parameters can be used to generate modified routes and select modified routes to be used. For example, selected route and non-included shipment combinations can be formed (e.g., modified routes can be formed, each including a selected route and one or more non-included shipments). These combinations can be compared to route criteria to determine whether each combination provides a cost savings (e.g., the cost of the combination is less than the sum of the cost associated with the corresponding selected route and non-included shipment(s)). Those combinations that do not provide a cost savings can be discarded. The remaining combinations can form a list of cost saving modified routes.

Versatilities can be determined for each modified route in the list of cost saving modified routes. A modified route can be selected from the list of cost saving modified routes based on the associated amount of cost savings, the associated versatility (e.g., a low versatility being desirable), and/or other route criteria such as whether the vehicle associated with the selected route can carry the added shipment(s). Once a modified route is selected from the list of cost saving modified routes, conflicting modified routes can be removed from the list and the process can be repeated until there are no remaining modified routes in the list of cost saving modified routes. This route modification feature can be particularly useful when the route generation processes discussed above with reference to block 208 in FIG. 2 is limited to a selected number of shipment combinations.

Figure 11:
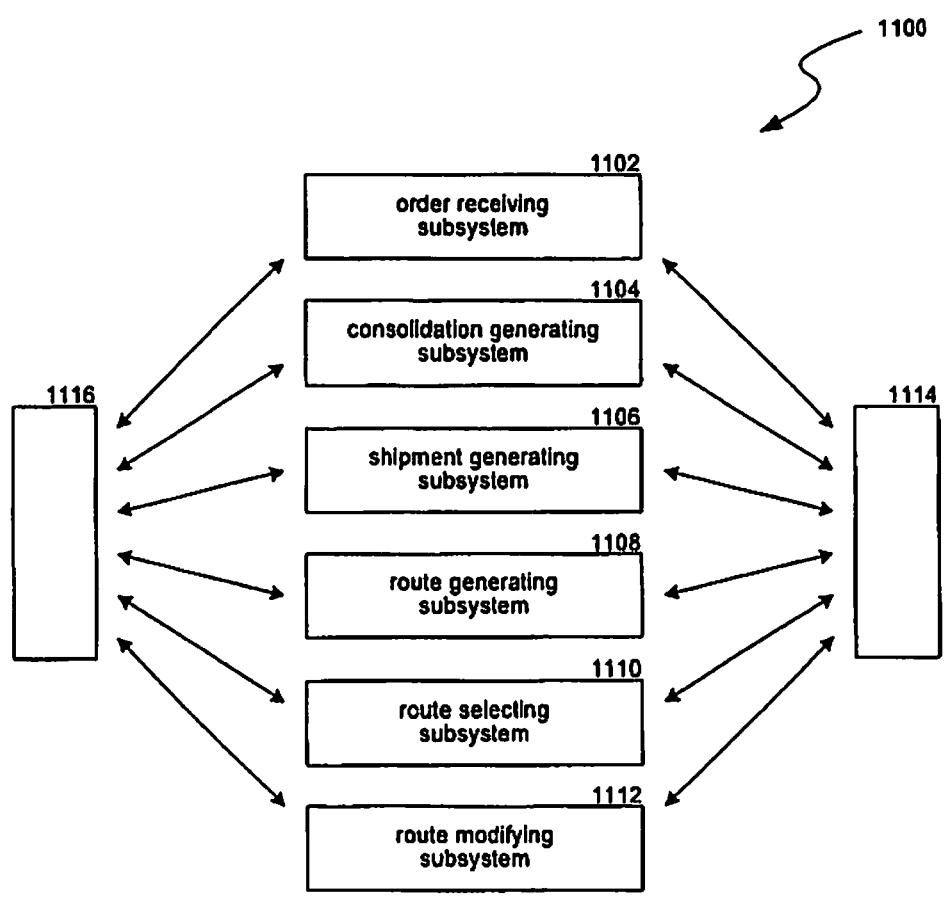
FIG. 11 is a partially schematic illustration of a computing system in accordance with selected embodiments of the invention.

As shown in FIG. 11, a computing system 1100 can include subsystems (e.g., hardware and/or software components or modules) for performing various portions of the process for determining one or more routes for transporting items shown in FIG. 2, in accordance with selected embodiments of the invention. For example, in FIG. 11 the computing system 1100 includes an order receiving subsystem 1102 for receiving orders, a consolidation generating subsystem 1104 for generating consolidation(s), a shipment generating subsystem 1106 for generating shipment(s), a route generating subsystem 1108 for generating route(s), and a route selection subsystem 1110 for selecting route(s). Additionally, in selected embodiments the computing system 1100 can include a route modifying subsystem 1112 for modifying route(s) (e.g., including generating modified routes and selecting modified routes). In other embodiments, the computing system 1100 can include more, fewer, and/or different subsystems. For example, in selected embodiments the consolidation generating subsystem 1104 and the shipment generating subsystem 1106 can be combined. Similarly, in certain embodiments the route generating subsystem 1108 and the route selecting subsystem 1110 can be combined.

In the illustrated embodiment, the computing system 1100 includes a costing subsystem 1114 and parameter/criteria subsystem 1116. In FIG. 11, the costing subsystem 1114 interfaces with the other subsystems and includes the necessary information and/or logic for associating costs with selected orders, consolidations, shipments, and/or routes. Additionally, in selected embodiments the costing subsystems 1114 can provide cost comparisons (e.g., compute cost savings) between selected orders, consolidations, shipments, and/or routes. In FIG. 11, the parameter/criteria subsystem 1116 interfaces with the other subsystems and includes the information and/or logic necessary to apply the various shipment parameter(s), route parameter(s), and/or route criteria discussed above. Additionally, in selected embodiments the parameter/criteria subsystem 1116 includes the necessary information/logic to assist the consolidation generating subsystem 1104 in generating consolidations.

In other embodiments, the computing system can include other arrangements, including more, fewer, and or different costing subsystem and parameter/criteria subsystem configurations. For example, in selected embodiments the costing subsystem can be included as part of the parameter/criteria subsystem. In other embodiments, the computing system does not include a costing subsystem and parameter/criteria subsystem, and the information/logic discussed above with reference to these subsystems are included in the other subsystems (e.g., in the order receiving subsystem, the consolidation generating subsystem, the shipment generating subsystem, the route generating subsystem, the route selection subsystem, and/or the route modifying subsystem).

Although many of the embodiments above have been described in the context of a computing system or a method in a computing environment, a person skilled in the art will recognize that various portions of the method can be performed manually and/or with various manual inputs by a user. Additionally, a person skilled in the art will recognize that an item associated with an order can include any material being transported from one location to another. For example, an item can include a gas, solid, liquid, a container, shipping materials, and/or the like. Furthermore, one skilled in the art will recognized that stops can be added to the routes to account for the need to reposition a vehicle when a selected shipment results in a vehicle being out of position (e.g., when the cost of repositioning a vehicle must be considered in the selection of routes). Additionally, as discussed above, in selected embodiments the vehicles being associated with an order can be owned by a single shipping company or the vehicle attributes can include vehicles and transportation methods involving various carriers (e.g., various shipping companies). Accordingly, the reliability of shipping companies, a desire to spread order transportation among different shipping companies, etc. can all be considered in selecting various routes.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A method in a computing system comprising a central processing unit for determining one or more routes for transporting items in a computationally efficient manner, the method comprising:
receiving multiple orders to transport items from an origination stop to a destination stop, wherein each order has:
an associated time attribute; and
an associated physical attribute;
generating, by the central processing unit, one or more consolidations, wherein each consolidation is associated with two or more orders having:
common origination stops;
common destination stops; and
compatible time attributes, and
wherein each consolidation includes:
a vehicle attribute;
an origination stop corresponding to the common origination stops of the two or more associated orders;
a destination stop corresponding to the common destination stops of the two or more associated orders;
a physical attribute corresponding to the physical attributes of the two or more associated orders; and
a time attribute compatible with the time attributes of the two or more associated orders;
generating one or more shipments, wherein each shipment includes:
a selected consolidation that meets at least one shipment parameter, or a single order;
generating one or more routes with an ordered sequence of stops, each route being associated with one or more shipments;
selecting one or more routes based on one or more route parameters; and
performing, by the central processing unit, at least one heuristic for increasing computational efficiency
wherein, for the heuristic, selecting one or more routes based on one or more route parameters includes:
for each of a plurality of orders, determining an appearance number of the order by counting the number of routes associated with the order;
for each of a plurality of routes, calculating the versatility of the route by:
if the route is associated with one order, using the appearance number of the one order, and
if the route is associated with multiple orders, summing the appearance numbers of the multiple orders associated with the route;
selecting a first portion of routes based on the versatility associated with each route, wherein the portion of routes with the lowest versatility is selected;
after each portion of routes is selected, eliminating all unselected routes associated with any order associated with a route in the selected portion; and
repeating the portion selecting and route eliminating steps for a second portion of routes, without considering any previously selected or eliminated route.

2. The method of claim 1, further comprising modifying at least one of the one or more selected routes to include an additional shipment.

3. The method of claim 1, further comprising: modifying at least one of the one or more selected routes to include an additional shipment; and
determining if the modified route meets one or more selected route criteria.

4. The method of claim 1,
wherein a selected consolidation meeting at least one shipment parameter includes a selected consolidation having a corresponding cost that is less than the sum of the costs corresponding to the two or more orders associated with the selected consolidation, and wherein generating one or more shipments includes: generating a cost corresponding to each order; generating a cost corresponding to each consolidation; selecting each consolidation; and determining whether the selected consolidation has a corresponding cost that is less than the sum of the costs corresponding to the two or more orders associated with the selected consolidation.

5. The method of claim 1 wherein generating one or more routes includes:

selecting one or more shipments having compatible time attributes and either compatible vehicle attributes or no vehicle attribute; and forming a route having a sequence of stops associated with the origination stops and the destination stops of the selected one or more shipments, the formed route being associated with a selected vehicle attribute.

6. The method of claim 1 wherein selecting one or more routes based on one or more route parameters includes:

generating a cost associated with each of the one or more routes; and selecting one or more routes based on the cost associated with each route.

7. The method of claim 1, wherein selecting one or more routes based on one or more route parameters additionally comprises:

generating a cost associated with each of the routes; and selecting the routes based on a combination of the versatility and the cost associated with each route.

8. A non-transitory computer-readable storage device storing instructions for controlling a computing environment to perform a method comprising:

receiving multiple orders to transport items from an origination stop to a destination stop, wherein each order has:
an associated time attribute; and
an associated physical attribute;

generating one or more consolidations, wherein each consolidation is associated with two or more orders having:
common origination stops;
common destination stops; and
compatible time attributes, and wherein each consolidation includes:
a vehicle attribute;
an origination stop corresponding to the common origination stops of the two or more associated orders;
a destination stop corresponding to the common destination stops of the two or more associated orders;
a physical attribute corresponding to the physical attributes of the two or more associated orders; and
a time attribute compatible with the time attributes of the two or more associated orders;

generating one or more shipments, wherein each shipment includes:
a selected consolidation that meets at least one shipment parameter, or a single order;

generating one or more routes with an ordered sequence of stops, each route being associated with one or more shipments;

selecting one or more routes based on one or more route parameters; and performing at least one heuristic for increasing computational efficiency wherein, for the heuristic, selecting one or more routes based on one or more route parameters includes:

for each of a plurality of orders, determining an appearance number of the order by counting the number of routes associated with the order;

for each of a plurality of routes, calculating the versatility of the route by:
if the route is associated with one order, using the appearance number of the one order, and
if the route is associated with multiple orders, summing the appearance numbers of the multiple orders associated with the route;

selecting a first portion of routes based on the versatility associated with each route, wherein the portion of routes with the lowest versatility is selected;

after each portion of routes is selected, eliminating all unselected routes associated with any order associated with a route in the selected portion; and repeating the portion selecting and route eliminating steps for a second portion of routes, without considering any previously selected or eliminated route.

9. The non-transitory computer-readable storage device of claim 8, wherein the method further comprises modifying at least one of the one or more selected routes to include an additional shipment.

10. The non-transitory computer-readable storage device of claim 8, wherein the method further comprises:

modifying at least one of the one or more selected routes to include an additional shipment; and determining if the modified route meets one or more selected route criteria.

11. The non-transitory computer-readable storage device of claim 8, wherein a selected consolidation meeting at least one shipment parameter includes a selected consolidation having a corresponding cost that is less than the sum of the costs corresponding to the two or more orders associated with the selected consolidation, and wherein generating one or more shipments includes: generating a cost corresponding to each order; generating a cost corresponding to each consolidation; selecting each consolidation; and determining whether the selected consolidation has a corresponding cost that is less than the sum of the costs corresponding to the two or more orders associated with the selected consolidation.

12. The non-transitory computer-readable storage device of claim 8 wherein generating one or more routes includes:

selecting one or more shipments having compatible time attributes and either compatible vehicle attributes or no vehicle attribute; and forming a route having a sequence of stops associated with the origination stops and the destination stops of the selected one or more shipments, the formed route being associated with a selected vehicle attribute.

13. The non-transitory computer-readable storage device of claim 8 wherein selecting one or more routes based on one or more route parameters includes:

generating a cost associated with each of the one or more routes; and selecting one or more routes based on the cost associated with each route.

14. The non-transitory computer-readable storage device of claim 8, wherein selecting one or more routes based on one or more route parameters additionally comprises:

generating a cost associated with each of the routes; and selecting the routes based on a combination of the versatility and the cost associated with each route.

* * * * *

UNITED STATES PATENT AND TRADEMARK OFFICE
CERTIFICATE OF CORRECTION

| | | |
|---|---|---|
| PATENT NO. | : 8,438,118 B2 | |
| APPLICATION NO. | : 13/229320 | |
| DATED | : May 7, 2013 | |
| INVENTOR(S) | : William P. C. Ho | |

It is certified that error appears in the above-identified patent and that said Letters Patent is hereby corrected as shown below:

In the Specification:

In column 6, line 54, delete "of" and insert -- off --, therefor. (First occurrence)

In column 11, line 18, delete "4!" and insert -- 41 --, therefor.

In column 17, line 20, delete "and or" and insert -- and/or --, therefor.

Signed and Sealed this
Third Day of September, 2013

Teresa Stanek Rea
*Acting Director of the United States Patent and Trademark Office*